UNITED STATES PATENT OFFICE.

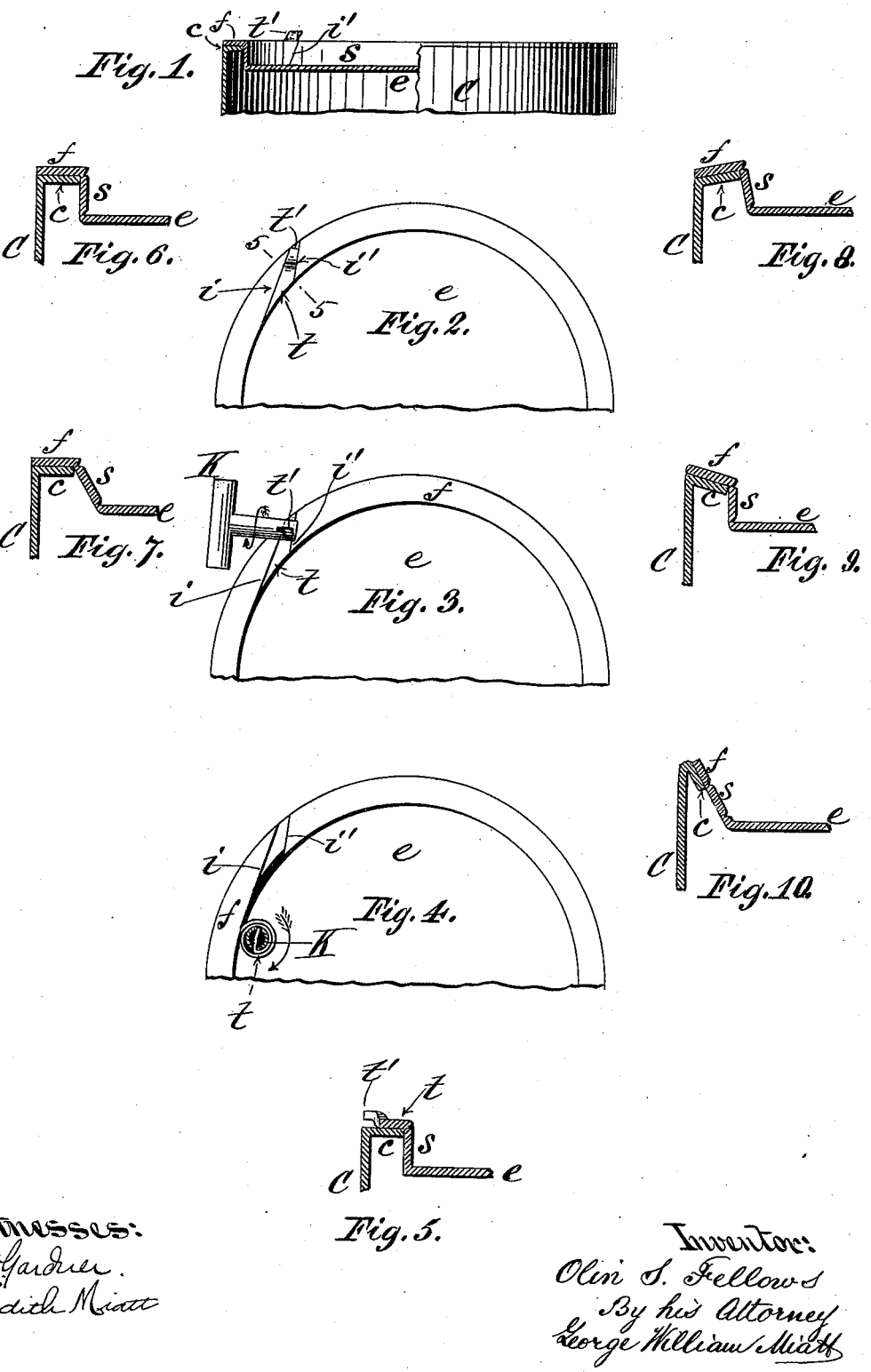

OLIN S. FELLOWS, OF MIDDLETOWN, NEW YORK.

SEALED PACKAGE.

SPECIFICATION forming part of Letters Patent No. 568,479, dated September 29, 1896.

Application filed April 23, 1895. Serial No. 546,885. (No model.)

*To all whom it may concern:*

Be it known that I, OLIN S. FELLOWS, a citizen of the United States, residing at Middletown, in the county of Orange and State of New York, have invented certain new and useful Improvements in Sealed Packages, of which the following is a specification sufficient to enable others skilled in the art to which the invention appertains to make and use the same.

My invention relates to sheet-metal cans designed to be opened by the removal of a stripping band or zone which is wound around the shank of a strip-winding key.

In my concurrent application, Serial No. 527,608, filed November 1, 1894, the essential feature consists in stripping off the inside flange of the end plate from the concave surface of the can-body to which it has been soldered.

In my concurrent application, Serial No. 546,267, filed April 18, 1895, I describe and claim a sheet-metal can having an end plate formed with a peripheral flange bent over parallel to the can-body and fitting over or inside the unbent edge thereof, to which it is soldered, the end plate being depressed centrally within the can-body and being formed with a concave stripping portion between said central depression and the peripheral flange; and I do not seek to cover such special construction herein.

My present invention also relates to the method of concave stripping; and it consists, essentially, in soldering an end plate formed with the concave stripping portion to an inwardly-projecting lateral flange upon the can-body by means of a corresponding flange upon the end plate, thereby dispensing with the ordinary exterior flange on the end plate and leaving the periphery of the can of uniform diameter.

A still more important feature which I am enabled to attain by my improved structure consists in the formation of the stripping-tongue at the edge of the can in the flange of the end plate in convenient position for the application of the strip-winding key, the shank of which is easily and naturally rolled across the transverse face of the flange and to the concave strip at such an angle as to avoid all danger of tearing the tongue or strip at their juncture, thereby insuring and facilitating the removal of the concave strip.

By my improved construction I also effect a saving in the soldering operation, since only the extreme edge of the can need be passed through the bath of solder, and the amount of solder taken up is simply that sufficient to make the joint and no more, whereas heretofore the depth to which the edges of the cans have been immersed in the soldering-bath in order to admit the solder between an outside flange and the can-body has been a source of loss of solder and disfiguration to the cans.

In the accompanying drawings, Figure 1 is a sectional elevation of one end of a sheet-metal can, illustrating my invention; Fig. 2, a view of a portion of the end of the form of can shown in Fig. 1; Fig. 3, a similar view illustrating the application of the strip-winding key; Fig. 4, a similar view illustrating the stripping operation, the shank of the strip-winding key being shown in section. Fig. 5 is a section, upon an enlarged scale, taken on plane of line 5 5, Fig. 2. Figs. 6 to 10, inclusive, show modifications in the relative angles of the soldering-flanges and the concave stripping-section.

The end of the can-body C is formed with the lateral flange $c$, projecting inward at any desired angle to the axis of the can. The end plate $e$ is formed with a corresponding flange $f$, which fits over the flange $c$ of the can-body C and is soldered thereto in the usual way. The end plate $e$ is depressed centrally more or less to form the concave stripping zone or section $s$, which occupies a position within and beyond the can-body adjoining the inner edge of the flange $c$, and said concave strip $s$ may extend either parallel to the can-body or at an angle thereto, as indicated in the drawings. The stripping-tongue $t$ is formed in the flange $f$, incisions $i\ i'$ or other suitable reductions in thickness being made across the flange $f$ and the extreme edge of the flange between the incisions being turned up slightly either before or after the soldering operation to form the tip $t'$ for engagement with the slot or bifurcated end of a strip-winding key, (represented symbolically by $k$ in the drawings.) The incision $i$ merges into the upper edge of the strip $s$ or into the angle between said strip and the flange *c*, while the other line of reduction in thickness, *i'*, either stops at said angle or is continued across the strip *s* transversely, as indicated in Fig. 1.

Where comparatively thin sheet metal is used for the end cap, the angles between the strip *s* and the portions of the end plate on either side may be relied upon to determine and control the lines of severance, as set forth in my concurrent application hereinbefore referred to; but where the nature of the metal requires it I bind the strip *s* with circuitous incisions *i i'* or other suitable lines of reduced thickness which the strip *s* will follow as it is wound off the end plate and around the shank of the strip-winding key.

By my invention I obtain an independent concave stripping-section free of the can-body and stripping from the end plate itself. The can-body, after the opening operation, is left of full capacity and with a margin of safety above the contents of the can, as in my concurrent application, Serial No. 527,608, hereinbefore referred to, and is also left with an inwardly-projecting rim consisting of the two flanges *c* and *f*, soldered together, thereby affording an additional protection to the contents of the can against spilling, &c. I also by my present special construction avoid the necessity of inserting a stripping-tongue or otherwise attaching it to the concave strip, as is requisite where an exterior flange is used to secure the end plate to the can-body, as in my last application, Serial No. 546,267, filed April 18, 1895, and I cheapen the manufacture by reducing the amount of solder absorbed or taken up by the can, an item of no small importance in the aggregate where large quantities of the cans are used.

What I claim as my invention, and desire to secure by Letters Patent, is—

A sheet-metal can having an internal flange formed on the end of the can-body, an end plate soldered to said internal flange on the can-body, said end plate being formed with a concave stripping-zone below the joint between the outer edge of the end plate and the interior flange of the can-body, the portion of the end plate adjoining the said stripping-zone being below said stripping-zone, and said stripping-zone being provided with a stripping-tongue for engagement with a strip-winding key around the shank of which the stripping-zone is wound to open the can, substantially in the manner and for the purpose described.

OLIN S. FELLOWS.

Witnesses:
GEO. WM. MIATT,
D. W. GARDNER.